United States Patent
Hu et al.

(10) Patent No.: US 11,175,475 B2
(45) Date of Patent: Nov. 16, 2021

(54) MULTIPLE-LENS CAMERA SYSTEM

(71) Applicant: TDK TAIWAN CORP., Taoyuan (TW)

(72) Inventors: Chao-Chang Hu, Taoyuan (TW);
Bing-Ru Song, Taoyuan (TW);
Chih-Wei Weng, Taoyuan (TW);
Shu-Shan Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 8 days.

(21) Appl. No.: 16/747,935

(22) Filed: Jan. 21, 2020

(65) Prior Publication Data

US 2020/0158986 A1 May 21, 2020

Related U.S. Application Data

(63) Continuation of application No. 15/635,964, filed on Jun. 28, 2017, now Pat. No. 10,571,645.

(60) Provisional application No. 62/357,557, filed on Jul. 1, 2016.

(30) Foreign Application Priority Data

Jun. 14, 2017 (CN) .......................... 201720690139.2

(51) Int. Cl.
*G02B 7/02* (2021.01)
(52) U.S. Cl.
CPC ..................................... *G02B 7/023* (2013.01)
(58) Field of Classification Search
CPC ......... G02B 7/023; G02B 7/08; H04N 5/2254
USPC .................................................. 359/822–824
See application file for complete search history.

(56) References Cited

U.S. PATENT DOCUMENTS

| 2009/0097837 | A1 | 4/2009 | Chen et al. |
| 2009/0195897 | A1 * | 8/2009 | Tsai ...................... H04N 5/2257 359/819 |
| 2009/0295983 | A1 * | 12/2009 | Sekimoto ............. G02B 13/001 348/362 |

(Continued)

FOREIGN PATENT DOCUMENTS

| KR | 1020170029984 | * | 3/2017 |
| WO | WO2015/124966 A1 | | 8/2015 |
| WO | WO2017/084090 A1 | | 5/2017 |

OTHER PUBLICATIONS

Examiner Report issued in corresponding IN application No. 201724023182 dated Jul. 24, 2020.

*Primary Examiner* — Mahidere S Sahle
(74) *Attorney, Agent, or Firm* — Muncy, Geissler, Olds and Lowe, P.C.

(57) ABSTRACT

A multiple-lens camera system is provided, including a first lens driving module, a second lens driving module, and a shielding member. The first and second lens driving modules respectively include a frame, a lens holder movably disposed in the frame for holding a lens, a magnetic element disposed on a side of the lens holder and a driving board, wherein the driving board has a first coil corresponding to the magnetic element, to generate a magnetic force for moving the lens holder and the lens relative to the driving board. The shielding member is disposed in the first lens driving module and between the two magnetic elements of the first and second lens driving modules which are adjacent to each other, to suppress magnetic interference between the first and second lens driving modules.

18 Claims, 10 Drawing Sheets

(56) References Cited

U.S. PATENT DOCUMENTS

| | | | |
|---|---|---|---|
| 2013/0044382 A1 | 2/2013 | Phoon et al. | |
| 2013/0215526 A1* | 8/2013 | Park | G02B 7/08 359/824 |
| 2014/0368914 A1 | 12/2014 | Hu et al. | |
| 2015/0362696 A1 | 12/2015 | Han et al. | |
| 2016/0018720 A1* | 1/2016 | Bachar | G02B 7/08 359/824 |
| 2016/0025995 A1* | 1/2016 | Ariji | G03B 5/04 359/557 |
| 2018/0275368 A1* | 9/2018 | Lee | G03B 3/10 |
| 2018/0348538 A1 | 12/2018 | Sugawara | |

* cited by examiner

MULTIPLE-LENS CAMERA SYSTEM

CROSS-REFERENCE TO RELATED APPLICATIONS

The present application is a continuation application of the U.S. patent application Ser. No. 15/635,964, which claims priorities of U.S. Provisional Application No. 62/357,557, filed on Jul. 1, 2016, and China Patent Application No. 201720690139.2, filed on Jun. 14, 2017, the entirety of which are incorporated by reference herein.

BACKGROUND OF THE DISCLOSURE

Field of the Disclosure

The invention relates to a multiple-lens camera system, and more particularly to a multiple-lens camera system that can move lenses using electromagnetic force.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses to be adversely affected. Therefore, what is needed is a dual-lens camera system that can prevent the magnetic interference between the two lens driving modules.

BRIEF SUMMARY OF THE DISCLOSURE

In view of the aforementioned problems, an object of the invention is to provide a multiple-lens camera system that can reduce the magnetic interference generated by the magnetic elements of the lens driving modules, thereby improving the focus speed and accuracy of the lenses in the camera system An embodiment of the invention provides an optical element driving mechanism including a movable portion, a fixed portion, a driving assembly, and a shielding member. The movable portion is connected to an optical element. The movable portion is movable relative to the fixed portion, and the fixed portion includes a frame having a polygonal structure when viewed along a main axis. The driving assembly drives the movable portion to move relative to the fixed portion. The shielding member has a magnetic-permeable material, disposed on a first side of the casing, wherein the shielding member is not disposed on a second side of the casing, and the first side of the casing is different from the second side of the casing.

In some embodiments, the movable portion includes a lens holder.

In some embodiments, the first side of the casing and the second side of the casing are not parallel to each other.

In some embodiments, the shielding member is not disposed on a third side of the casing, and the first side of the casing and the third side of the casing are parallel to each other.

In some embodiments, the frame includes a top surface, a first sidewall, and a second sidewall. The top surface has a polygonal structure. The first sidewall extends from an edge of the top surface along the main axis and located on the first side of the casing. The second sidewall extends from an edge of the top surface along the main axis and located on the second side of the casing, wherein the first sidewall and the second sidewall are located on a first imaginary plane and a second imaginary plane respectively, and the first imaginary plane and the second imaginary plane are not parallel to each other.

In some embodiments, the shielding member has a plate-like structure, and the shielding member is parallel to the first sidewall.

In some embodiments, the shielding member is disposed between the driving assembly and the first sidewall, and when viewed in a first direction in which the shielding member is aligned with the first sidewall, the driving assembly, the shielding member, and the first sidewall at least partially overlap.

In some embodiments, the driving assembly includes a plurality of magnetic elements and a driving board.

In some embodiments, the plurality of magnetic elements include a first magnetic element and a second magnetic element.

In some embodiments, the first magnetic element has a second magnetic pole group disposed along the first direction, and the first magnetic pole group and the second magnetic pole group are arranged along the main axis.

In some embodiments, the second magnetic element is disposed on the second side of the casing, and the first magnetic element, the second magnetic element, and the shielding member at least partially overlap when viewed in the first direction.

In some embodiments, the second magnetic element is disposed on the second side of the casing, and the second magnetic element does not overlap the shielding member when viewed in the first direction.

In some embodiments, the first magnetic element has a first magnetic pole group disposed along the first direction.

In some embodiments, the first magnetic element has a second magnetic pole group disposed along the first direction, and the first magnetic pole group and the second magnetic pole group are arranged along the main axis.

In some embodiments, the plurality of magnetic elements include a magnet, and the shielding member protrudes from an upper end of the magnet.

In some embodiments, the plurality of magnetic elements include a multipolar magnet having an upper portion and a lower portion, and the polar directions of the upper and lower portions are opposite to each other, wherein the ratio of the height of the upper portion along an optical axis of the lens to the height of the lower portion along the optical axis is ranged between 0.9 to 1.1.

In some embodiments, the plurality of magnetic elements include a multipolar magnet having an upper portion and a lower portion, and the polar directions of the upper and lower portions are opposite to each other, wherein the upper portion is positioned corresponding to the second coil to move the lens holder relative to the frame along an optical axis of the lens, and the ratio of the height of the upper portion along the optical axis to the height of the lower portion along the optical axis is greater than 1.1.

In some embodiments, the shielding member is affixed to the frame by insert molding.

An embodiment of the invention provides a multiple-lens camera system including an optical module and an optical element driving mechanism, wherein the optical element driving mechanism corresponds to the optical module.

In some embodiments, the first side of the casing is adjacent to the optical module.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE DISCLOSURE

The making and using of the embodiments of a multiple-lens camera system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
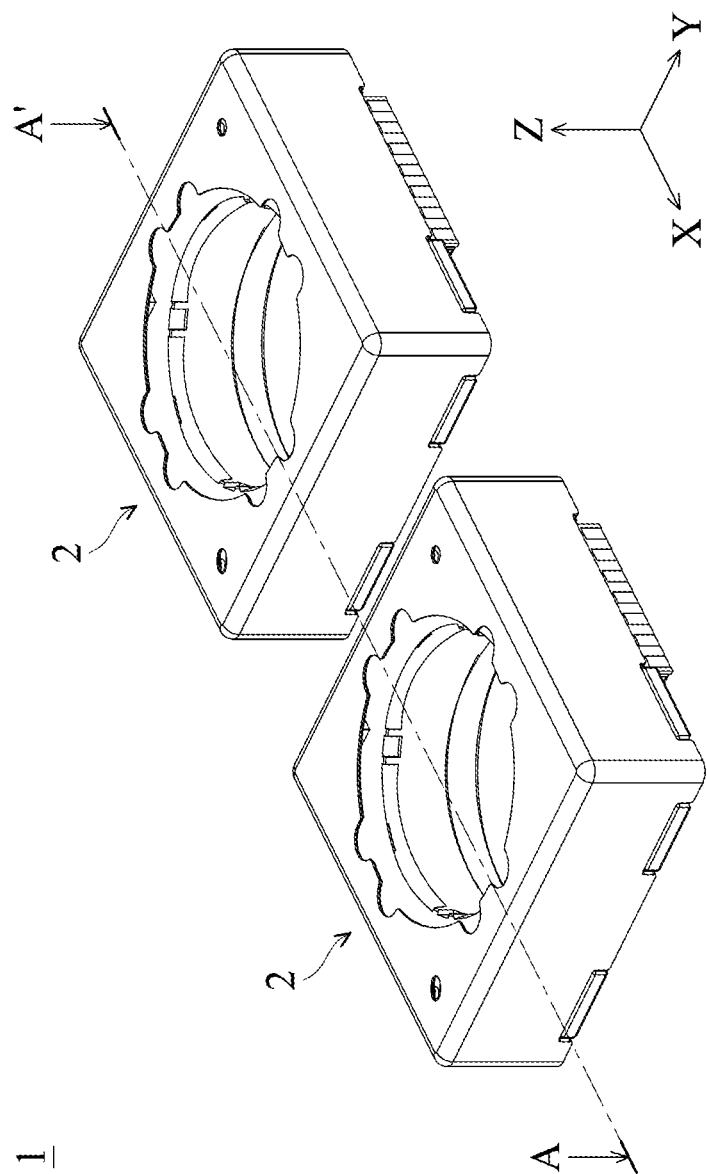
FIG. 1 is a schematic view of a multiple-lens camera system in accordance with an embodiment of the invention.
Figure 2:
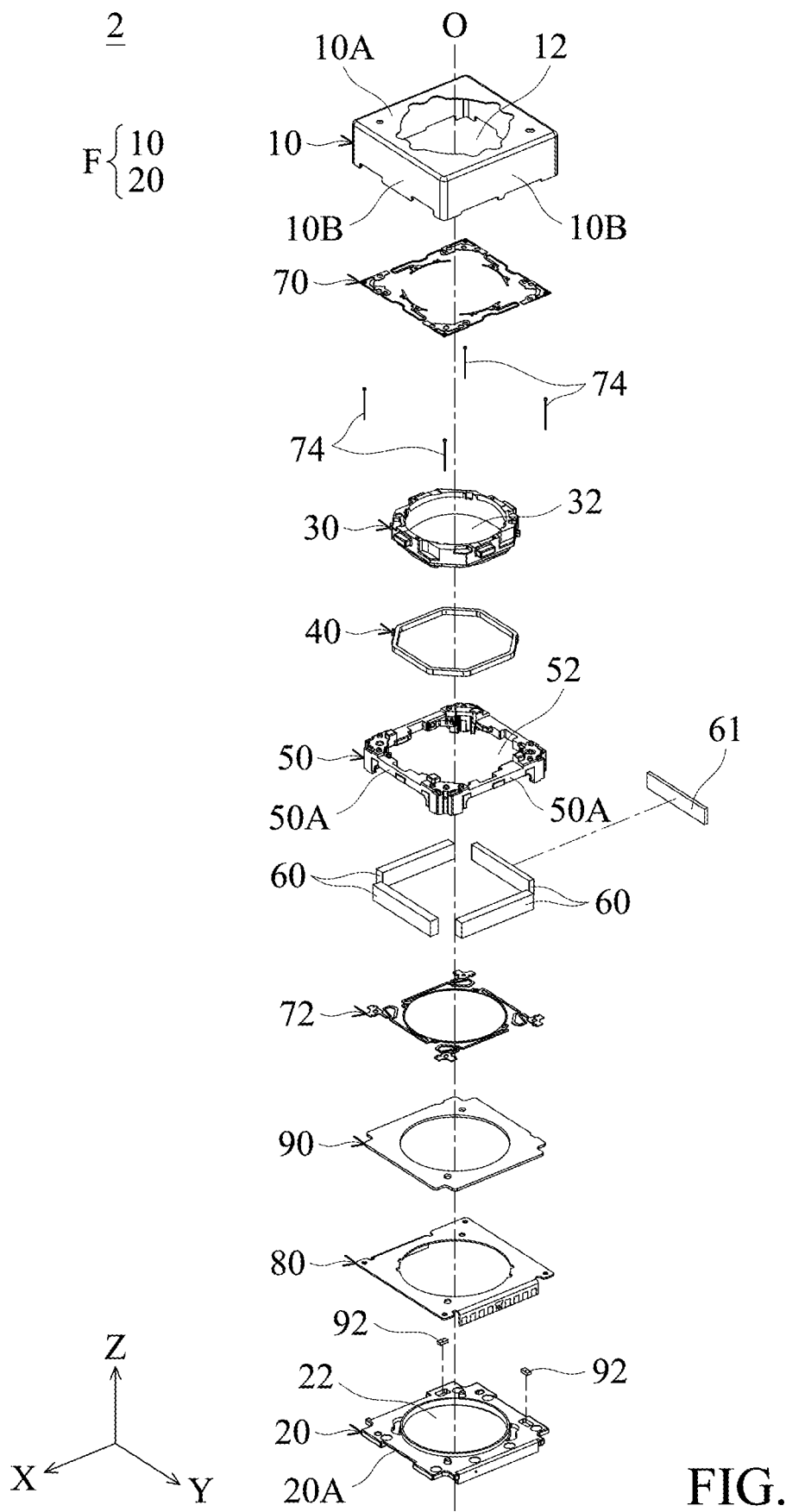
FIG. 2 is an exploded view of a lens driving module in FIG. 1.
Figure 3A:
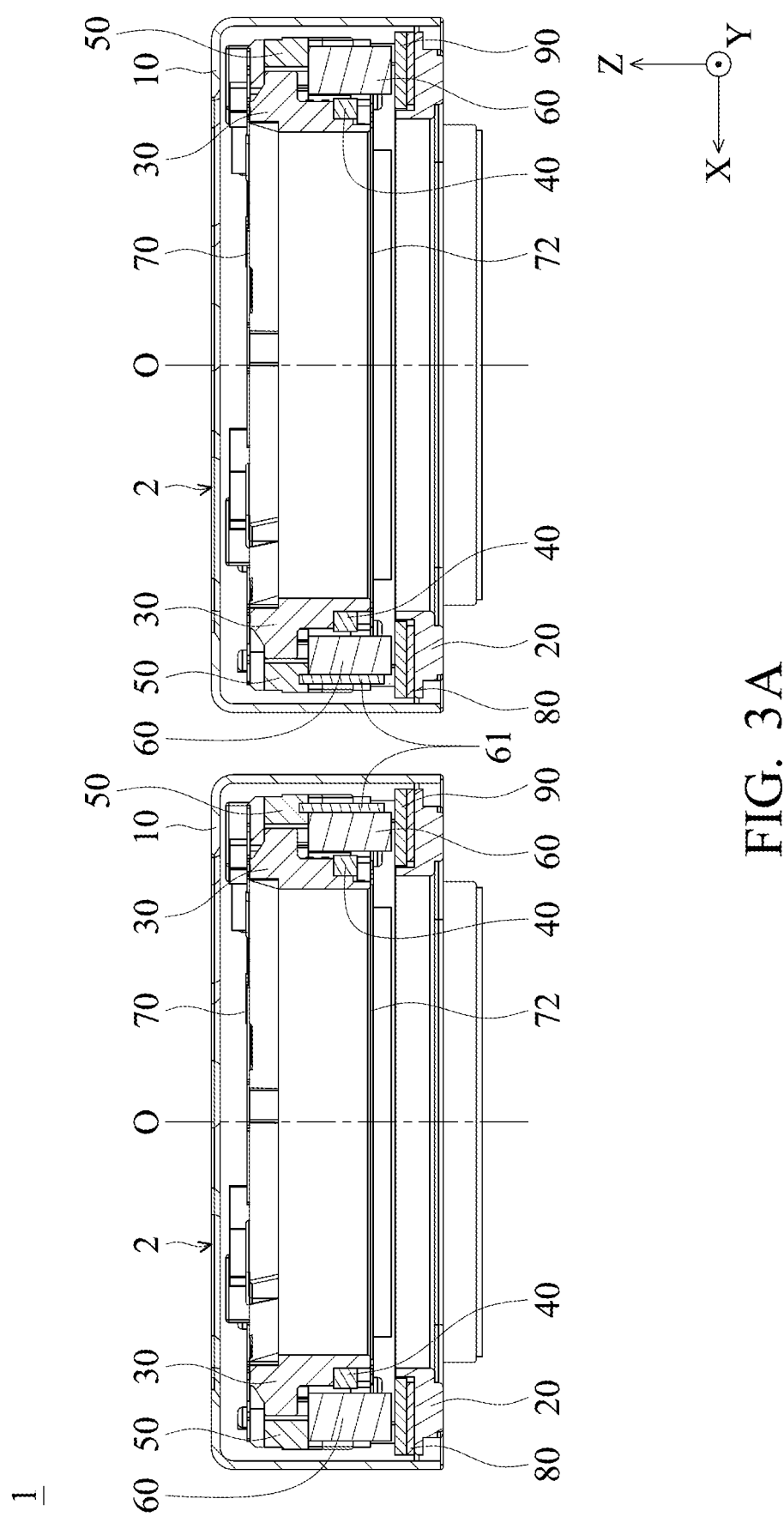
FIG. 3A is a cross-sectional view take along the line A-A' in FIG. 1.

Referring to FIGS. 1-3A, FIG. 1 is a perspective diagram of a multiple-lens camera system 1 according to an embodiment of the invention, FIG. 2 is an exploded diagram of a lens driving module 2 of the multiple-lens camera system 1 in FIG. 1, and FIG. 3A is a sectional view along line A-A' in FIG. 1. In this embodiment, two lens driving modules 2 of the multiple-lens camera system 1 are arranged along a longitudinal direction (the X axis) in a handheld electronic device, such as mobile phone or tablet computer. The two lens driving modules 2 may have the same specification and are capable of Optical Image Stabilization (OIS) and Auto focusing (AF), but the invention is not limited thereto. In some embodiments, the two lens driving modules 2 may have different sizes and specifications and are both capable of Optical Image Stabilization (OIS) and Auto focusing (AF).

As shown in FIG. 1-3A, each of the lens driving modules 2 comprises a top casing 10, a base 20, a lens holder 30, a coil 40, a frame 50, four magnets 60 (magnetic element), a shielding member 61, an upper spring sheet 70, a lower spring sheet 72, a plurality of flexible members 74, a circuit board 80, a driving board 90, and two magnetic sensors 92.

The top casing 10 has a hollow structure. Also, the top casing 10 can be combined with the base 20 to form a housing F of the lens driving module 2, wherein the top casing 10 constitutes a top wall 10A and four sidewalls 10B of the housing F, and the base 20 constitutes a bottom wall 20A of the housing F. In addition, a top casing opening 12 and a base opening 22 are respectively formed on the top casing 10 and the base 20. The center of the top casing opening 12 is located on an optical axis O (parallel to the Z axis) of a lens (not shown). The base opening 22 is also located on the optical axis O and faces an image sensor (not shown) placed outside the lens driving module 2. Accordingly, the lens in the lens driving module 2 and the image sensor can perform image focusing in the direction of the optical axis O.

The frame 50 has an opening 52 and four side of the casings 50A respectively corresponding to the four sidewalls 10B of the housing F. In this embodiment, the four driving magnets 60 are affixed to the four side of the casings 50A. In some embodiments, the four driving magnets 60 may also be affixed to four corners of the frame 50. The shape of the driving magnets 60 may be a long strip.

The lens holder 30 has a hollow structure and a through hole 32. The through hole 32 forms a threaded structure (not shown) corresponding to another threaded structure on the outer peripheral surface of the lens, such that the lens can be secured in the through hole 32. The driving coil 40 (second driving coil) is wound around the outer peripheral surface of the lens holder 30.

In this embodiment, the lens holder 30 and the lens therein are movably disposed in the frame 50. More specifically, the lens holder 30 is suspended in the center of the frame 50 by the upper spring 70 and the lower spring 72 made of a metal material. When a current is supplied to the driving coil 40, the driving coil 40 can act with the magnetic field of the driving magnets 60 to generate an electromagnetic force to move the lens holder 30 and the lens therein along the Z axis with respect to the frame 50. In some embodiments, the four driving magnets 60 (magnetic elements) may include at least one multipole magnet which is used to electromagnetically act with the driving coil 40 to move the lens holder 30 and the lens along the optical axis O, so as to perform image focusing.

The outer peripheral portions of the upper and lower springs 70 and 72 are respectively connected to the upper and lower sides of the frame 50, and the inner peripheral portions of the upper and lower springs 70 and 72 are respectively connected to the upper and lower sides of the lens holder 30, so that the lens holder 30 can be suspended in the frame 50.

The circuit board 80, such as a flexible printed circuit board (FPC), is affixed to the base 20 by adhesion, for example. In this embodiment, the circuit board 80 is electrically connected to a driving unit (not shown) placed outside the lens driving module 2 to perform OIS and other functions (such as AF function).

One end of the four suspension wires 74 is affixed to the circuit board 80 and the other end is connected to the upper spring 70, so that the suspension wires 74 can suspend the frame 50 and the lens holder 30 in the housing F. The suspension wires 74 may comprise a metal material.

The driving board 90, such as a printed circuit board, has four first driving coils (not shown) therein. The positions of the four first driving coils respectively correspond to the positions of the four driving magnets 60. The driving board 90 is affixed to the circuit board 80 by adhesion, for example.

It should be realized that the circuit board 80 is provided with wiring (not shown) for transmitting electrical signals to the driving coil 40 and the first driving coils of the driving board 90. In some embodiments, the wiring on the circuit board 80 may be electrically connected to the driving coil 40 through the suspension wires 74 and the upper spring 70, thereby controlling the movement of the lens holder 30 along the optical axis O.

In this embodiment, two magnetic field sensing elements 92 are respectively mounted on two sides of the base 20 extending in the X and Y directions. The two magnetic field sensing elements 92 may be Hall effect sensors, MR sensors, or Fluxgate sensors, and can be used to learn the position offset amount of the frame 50 and the lens holder 30 with respect to the base 20 in the X and Y directions by detecting the magnetic field variation of the magnetic elements 60 on the frame 50.

Furthermore, the circuit board 80 can generate electrical signals to be transmitted to the first driving coils of the driving board 90, and the first driving coils can act with the driving magnets 60 on the frame 50 to generate an electromagnetic force to move the frame 50 and the lens holder 30 therein along a direction that is perpendicular to the optical axis O (parallel to the XY plane) to compensate for the position offset described above. As a result, the OIS function is achieved.

Because the two lens driving modules 2 in the multiple-lens camera system 1 are close to each other, magnetic interference between two adjacent driving magnets 60 respectively in the two lens driving modules 2 is likely to occur, causing the focus speed and accuracy of the lenses to be adversely affected. As shown in FIG. 3A, to suppress magnetic interference between the two lens driving modules 2, two shielding members 61 are respectively provided in the lens driving modules 2 and between the two adjacent driving magnets 60.

Figure 3B:
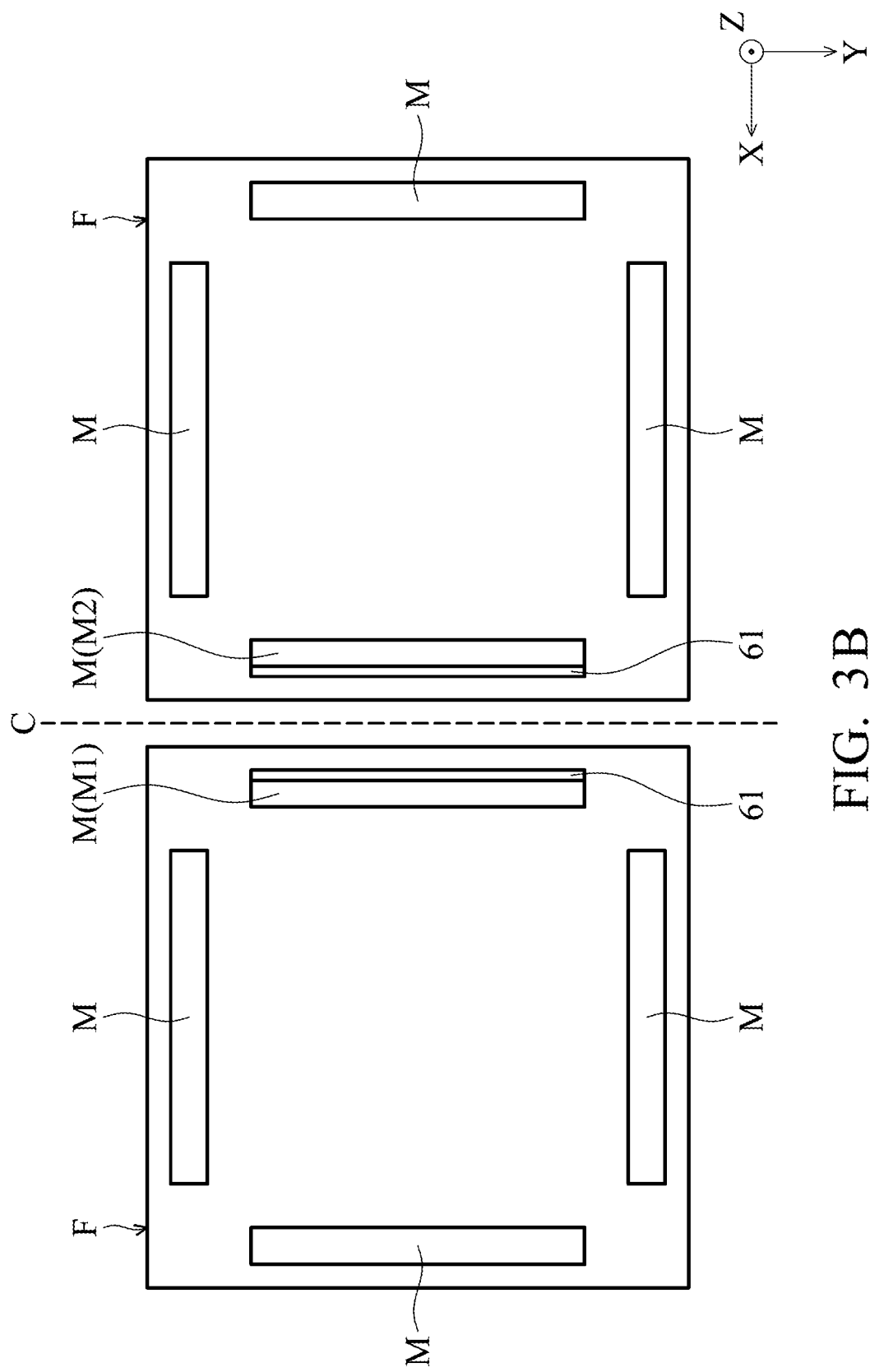
FIG. 3B is a schematic plane view showing the configuration of the magnetic elements and the shielding members in the multiple-lens camera system of FIG. 3A.

FIG. 3B shows the configuration of a plurality of magnetic elements M and shielding members 61 in the multiple-lens camera system 1. For the sake of simplicity and clarity, this embodiment and the following embodiments illustrate only the housings F, the magnetic elements M, and the shielding members 61 of the two lens driving modules to show their relative positions. As shown in FIG. 3B, the multiple-lens camera system 1 primarily comprises two lens driving modules 2 (a first lens driving module and a second lens driving module respectively on the left and right sides), and the magnetic elements M (corresponding to the driving magnets 60 in FIGS. 2 and 3A) have substantially the same structure (for example, all are long strip magnets). To distinct the two adjacent magnetic elements received in different housings F of the two lens driving modules 2 from the other magnetic elements, they are indicated as M1 and M2 and symmetrical with respect to a middle line C between the two housings F. Specifically, in order to reduce the magnetic interference between the magnetic elements M1 and M2 which are close to each other, a shielding member 61 is disposed on the right side of the magnetic element M1, and another shielding member 61 is disposed on the left side of the magnetic element M2 to overcome this problem, thereby ensuring the focus speed and accuracy of the lenses of the multiple-lens camera system.

Figure 4A:
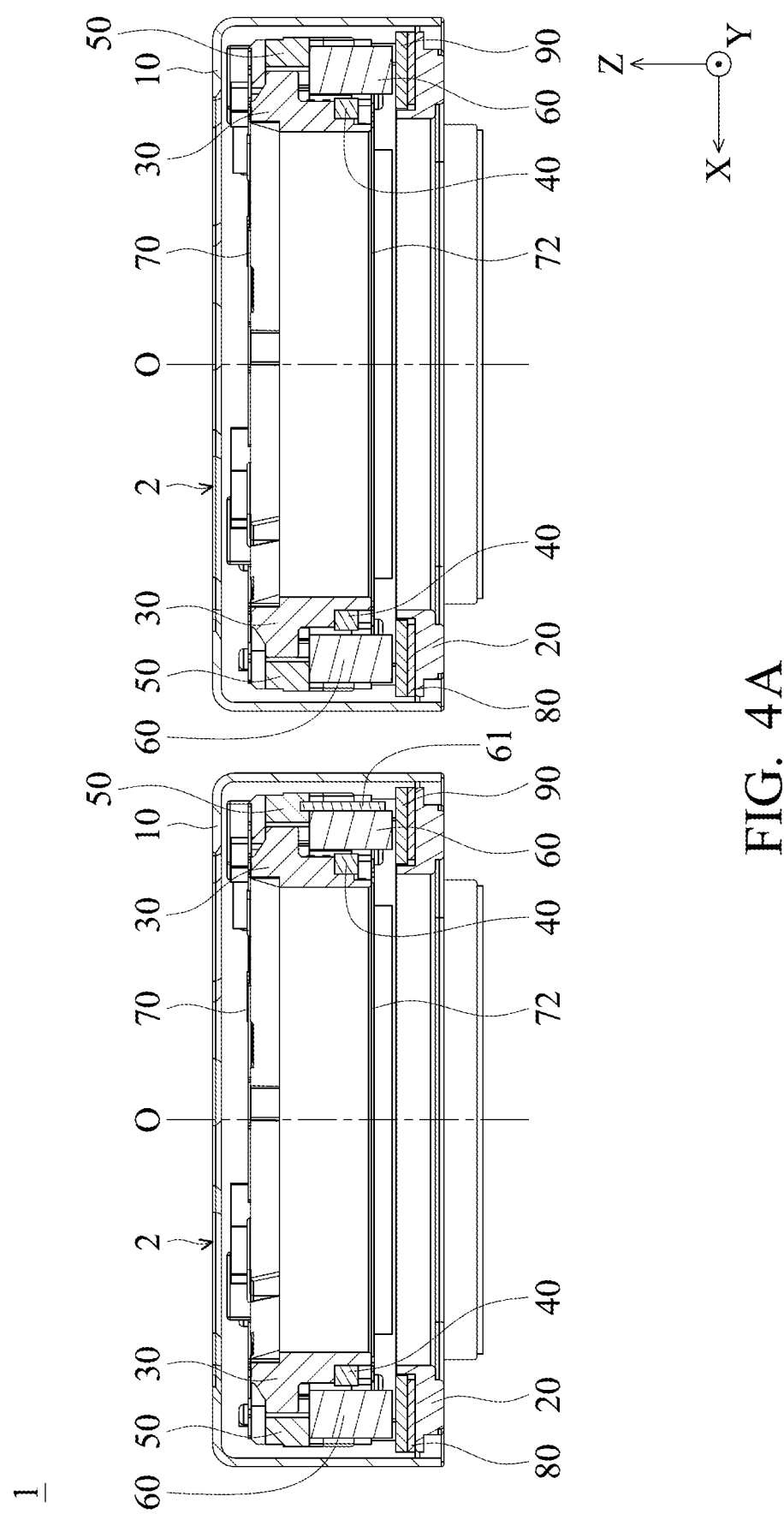
FIG. 4A is a cross-sectional view of a multiple-lens camera system in accordance with another embodiment of the invention.
Figure 4B:
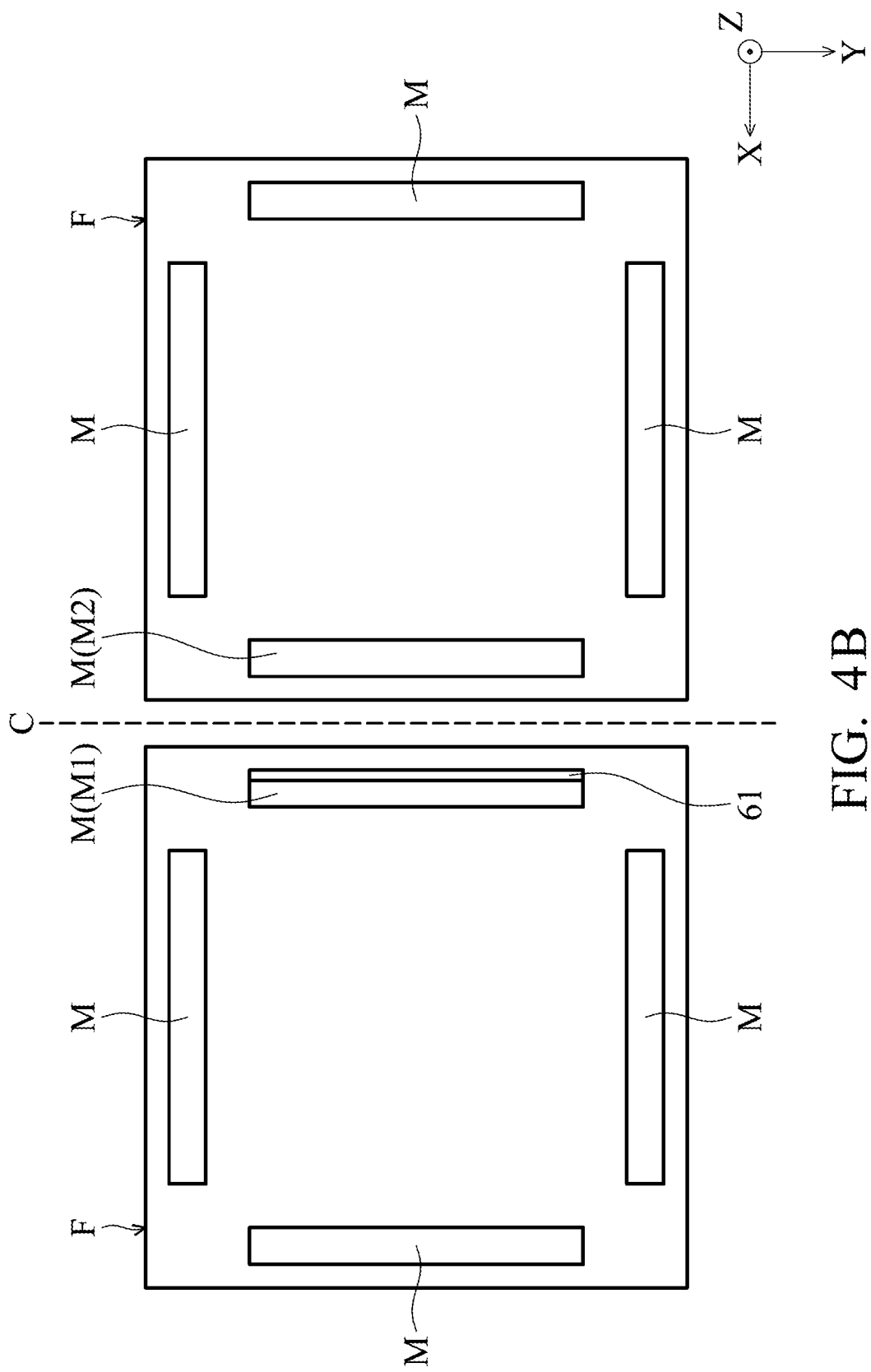
FIG. 4B is a schematic plane view showing the configuration of the magnetic elements and the shielding member in the multiple-lens camera system of FIG. 4A.

In some embodiments, the multiple-lens camera system 1 may have only one shielding member 61 disposed on the right side of the magnetic element M1 or on the left side of the magnetic element M2, to reduce the magnetic interference therebetween. As shown in FIGS. 4A and 4B, only one shielding member 61 is provided on the right side of the magnetic element M1 (corresponding to the driving magnet 60 in FIG. 4A). With the shielding member 61 disposed between the two magnetic elements M1 and M2, the magnetic interference between the two lens driving modules 2 can therefore be reduced.

Figure 5:
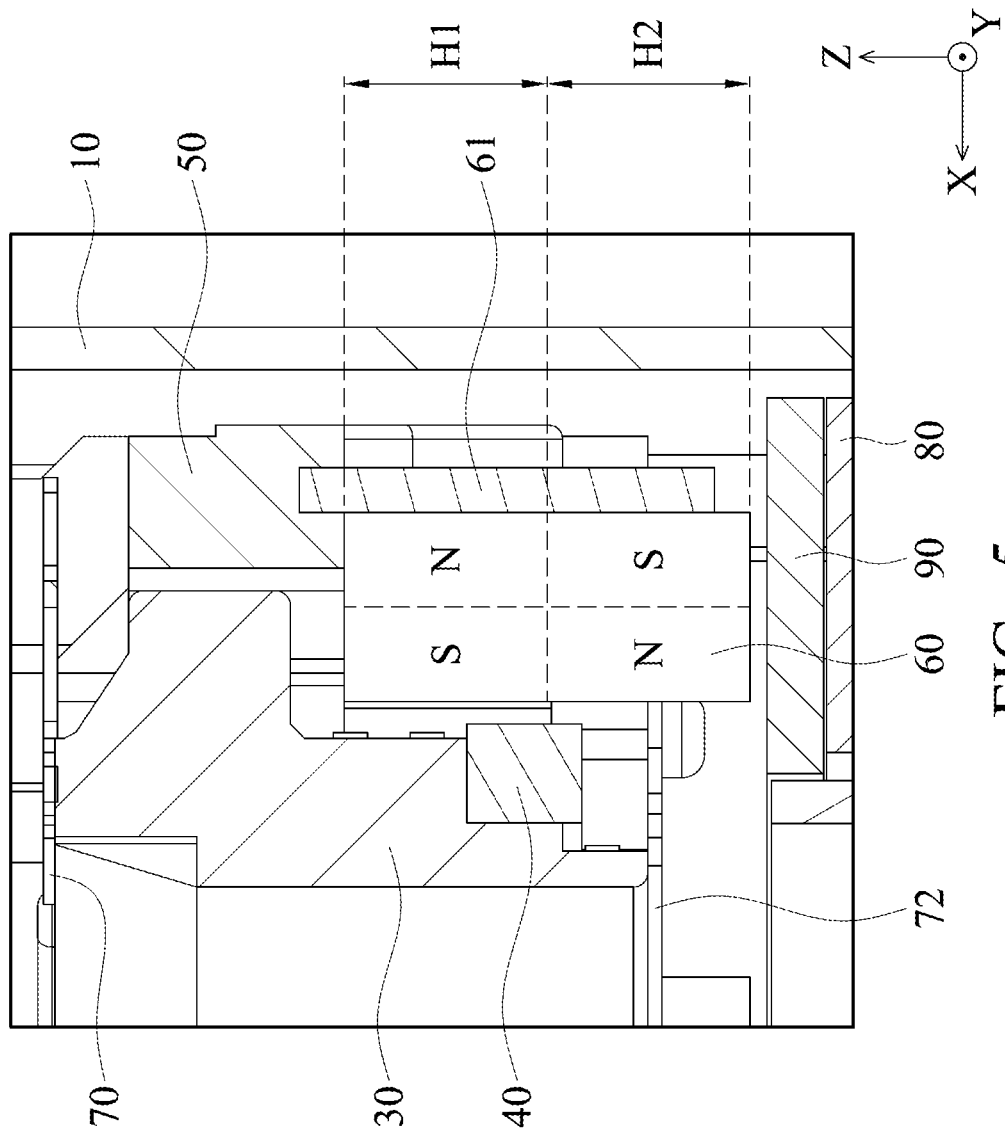
FIG. 5 is partial cross-sectional view of a lens driving module of a multiple-lens camera system in accordance with another embodiment of the invention.

In the aforementioned embodiments, the magnetic elements M (corresponding to the driving magnets 60 in FIGS. 2, 3A and 4A) may be permanent magnet or multipolar magnets. Referring to FIG. 5, the driving magnet 60 which is adjacent to another lens driving module 2 can be a quadrapolar magnet. Since multipolar magnet can produce relatively little interference with other magnetic element, it can be used with the shielding member 61 to further reduce the magnetic interference between the two lens driving modules 2, thereby ensuring the focus speed and accuracy of the lenses of the multiple-lens camera system.

Figure 6:
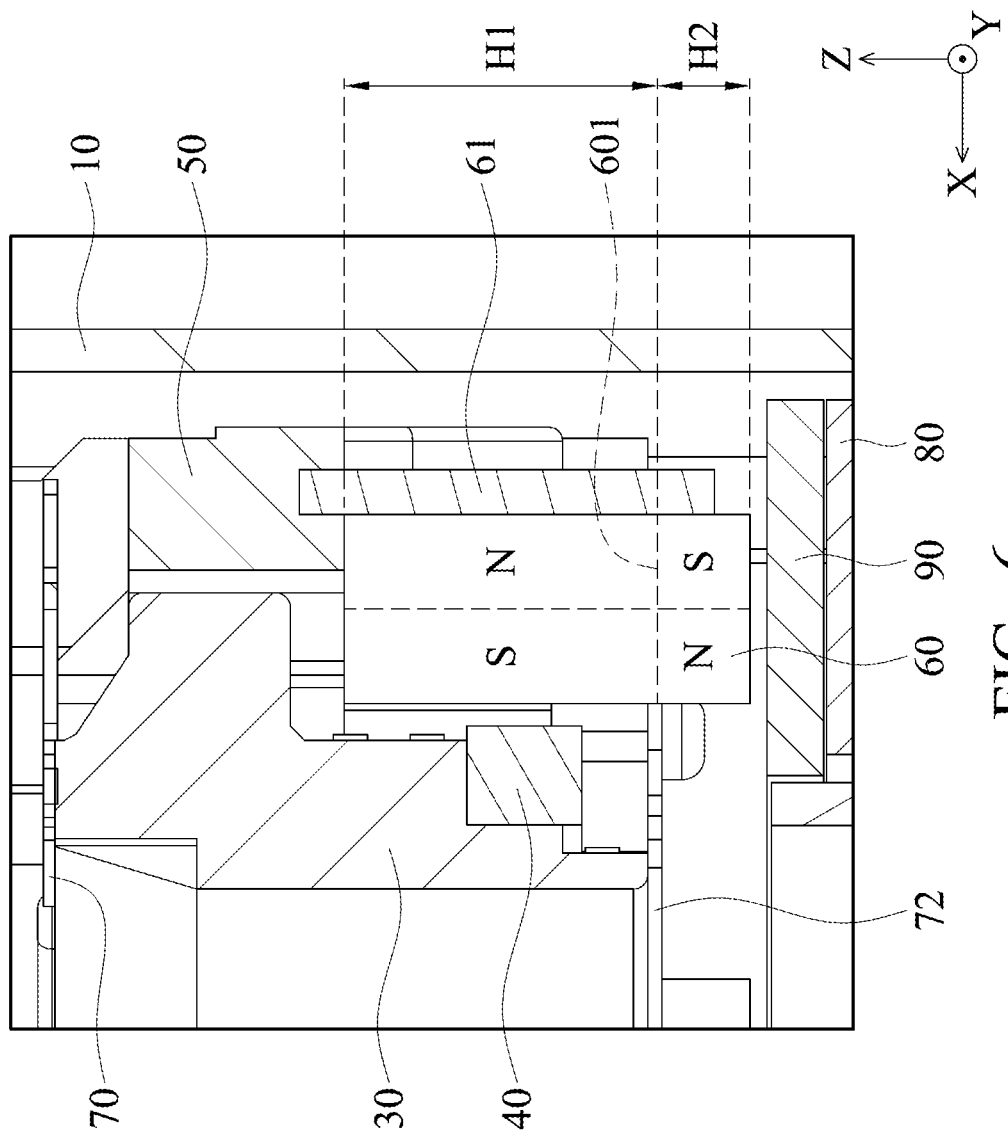
FIG. 6 is partial cross-sectional view of a lens driving module of a multiple-lens camera system in accordance with another embodiment of the invention.

As depicted in FIG. 5, the multipolar driving magnet 60 have an upper portion and a lower portion, wherein the polar directions (N-S) of the upper and lower portions are opposite to each other. In this embodiment, the upper portion has a height H1 along the Z axis, and the lower portion has a height H2 along the Z axis, wherein H1/H2 is substantially ranged between 0.9 to 1.1 (for example, H1:H2=1:1), so as to reduce the magnetic interference between the two lens driving modules 2. However, the ratio of H1/H2 may also be modified depending on design requirements. Referring to FIG. 6, to enhance the electromagnetic force produced between the coil 40 and the upper portion of the driving magnet 60 for moving the lens holder 30 and the lens therein along the Z axis, the ratio of H1/H2 may exceed 1.1.

FIG. 6 shows a boundary line 601 that divides the driving magnet 60 into the upper portion and the lower portion, and the boundary line 601 is lower than the coil 40. Thus, a stronger electromagnetic force can be generated by the upper portion of the driving magnet 60 and the coil 40 to move the lens holder 30 and the lens therein along the Z axis. In some embodiments, the boundary line 601 may be lower than the bottom surface of the lower spring sheet 72, so as to further increase the electromagnetic force for moving the lens holder 30 and the lens therein along the Z axis.

It should be noted that the shielding member 61 can be integrally formed on the frame 50 in advance, and then the driving magnet 60 can be affixed in the recess formed by the frame 50 and the driving magnet 60, wherein the driving magnet 60 may slightly protrude from the lower end of the shielding member 61. In an exemplary embodiment, the upper end of the shielding member 61 may be integrally formed in the frame 50 by insert molding, and the driving magnet 60 is subsequently affixed to the frame 50 and the shielding member 61. As the frame 50 is usually made of plastic material, and both of the driving magnet 60 and the shielding member 61 may comprise metal material such as iron, the driving magnet 60 can be firmly affixed to the shielding member 61 due to their bonding strength higher than that between the driving magnet 60 and the frame 50, thereby efficiently improving the positioning accuracy during assembly and the structural strength of the product after assembly.

Figure 7:
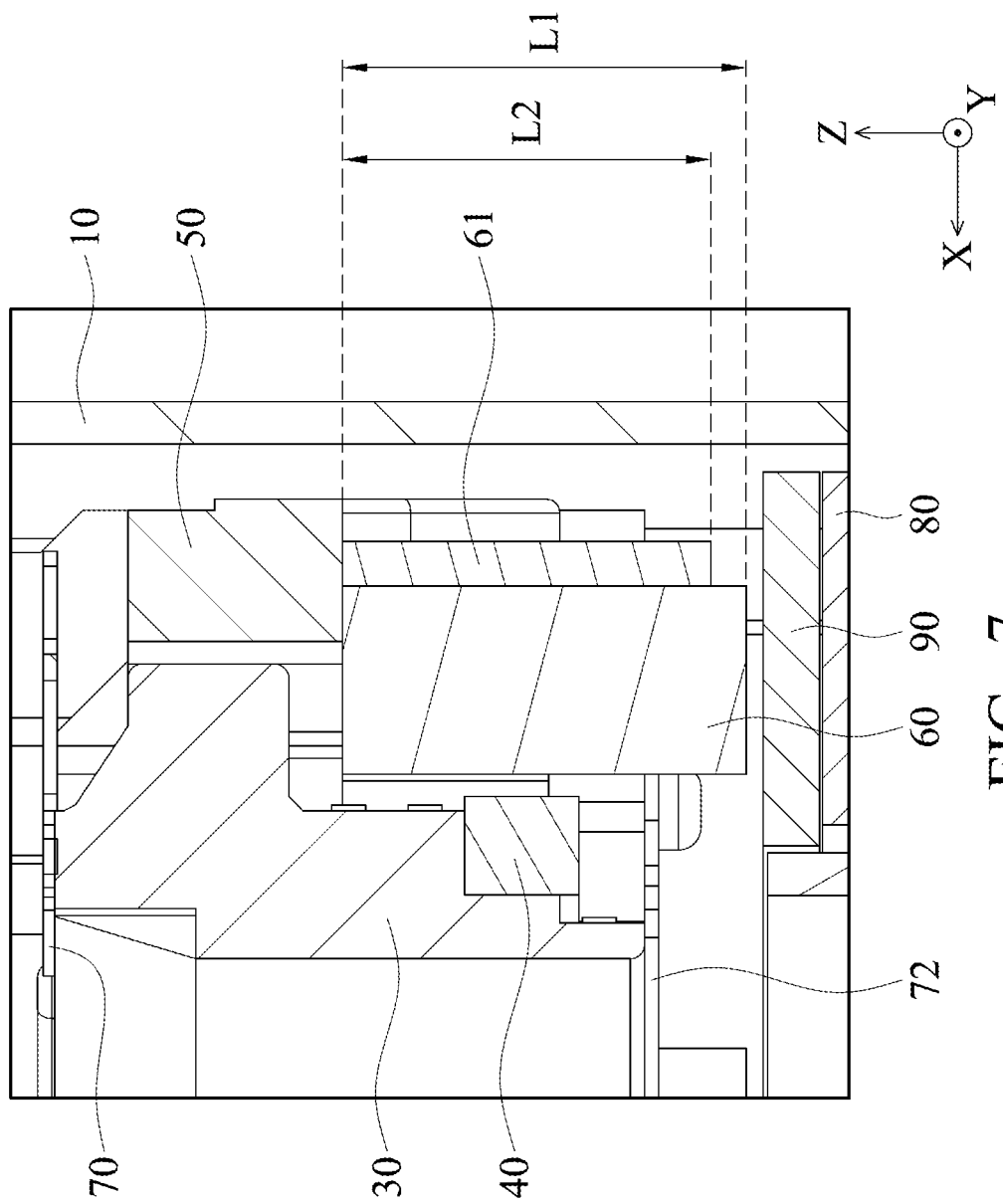
FIG. 7 is partial cross-sectional view of a lens driving module of a multiple-lens camera system in accordance with another embodiment of the invention.

Referring to FIG. 7, a shielding member 61 according to another embodiment has an upper end aligned with a top surface of the driving magnet 60, and a lower portion of the driving magnet 60 protrudes from the lower end of the shielding member 61. That is, the driving magnet 60 has a height L1 greater than a height L2 of the shielding member 61 along the Z axis. It should be noted that the driving magnet 60 and the shielding member 61 in all the embodiments can be affixed to each other by adhesive. With the shielding member 61 disposed on the outer side of the driving magnet 60, the magnetic interference between the driving magnets in different lens driving modules 2 can be efficiently reduced, thereby ensuring the focus speed and accuracy of the lenses in the multiple-lens camera system.

Figure 8:
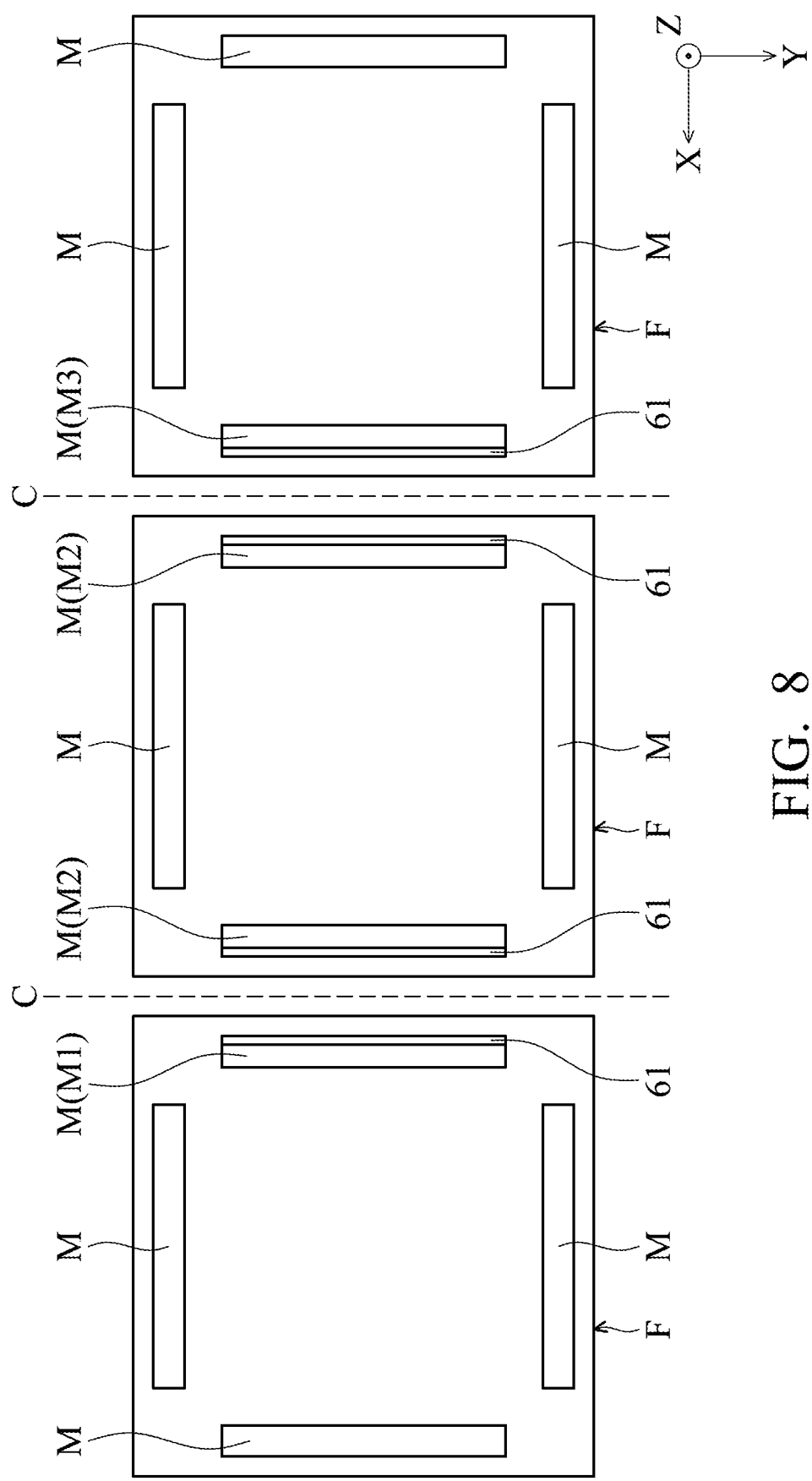
FIG. 8 is a schematic plane view showing the configuration of the magnetic elements and the shielding members in the multiple-lens camera system in accordance with another embodiment of the invention.

Referring to FIG. 8, a multiple-lens camera system according to another embodiment has three lens driving nodules (the first, second, and third lens driving modules from the left to the right). In this embodiment, each lens driving nodule may have substantially the same configuration as disclosed in FIG. 2, and the only difference among the three lens driving nodules is the arrangement of the shielding members 61. As shown in FIG. 8, the magnetic elements M (corresponding to the driving magnets 60 in FIGS. 2 and 3A) may have the same structure such as long strip magnets. For the sake of simplicity and clarity, the adjacent magnetic elements M in different housings F of the lens driving nodules are indicated as M1, M2, and M3, and they are substantially symmetrical with respect to the middle lines C between the housings F. It should be noted that all the modified embodiments shown in FIGS. 3A to FIG. 7 may also be applied to the first and second lens driving modules in FIG. 8.

As the magnetic elements M1, M2, and M3 in FIG. 8 are close to each other and may cause magnetic interference therebetween, four shielding members 61 are disposed on the right side of the magnetic element M1, the left and right sides of the magnetic element M1, M2, and the left side of the magnetic element M3, respectively. In some embodiments, the multiple-lens camera system may have at least one shielding member 61 between the two magnetic elements M1 and M2, and at least one shielding member 61 between the two magnetic elements M2 and M3, so as to suppress magnetic interference between the three lens driving nodules, and ensure the focus speed and accuracy of the lenses in the multiple-lens camera system.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable portion, connected to an optical element;
   a fixed portion, wherein the movable portion is movable relative to the fixed portion, and the fixed portion comprises a casing having a polygonal structure when viewed along a main axis;
   a driving assembly, driving the movable portion to move relative to the fixed portion, comprising a first magnetic element disposed fixedly on the movable portion, the first magnetic element comprise a first magnetic pole group having a N pole and a S pole disposed along a first direction and a second magnetic pole group having a N pole and a S pole disposed along the first direction, and the first magnetic pole group and the second magnetic pole group are arranged in a direction that is perpendicular to the first direction; and
   a shielding member, having a magnetic-permeable material and fixedly connected to the first magnetic element, disposed on a first side of the casing,
   wherein the shielding member is not disposed on a second side of the casing, and the first side of the casing is different from the second side of the casing.

2. The optical element driving mechanism as claimed in claim 1, wherein the movable portion comprises a lens holder.

3. The optical element driving mechanism as claimed in claim 1, wherein the first side of the casing and the second side of the casing are not parallel to each other.

4. The optical element driving mechanism as claimed in claim 3, wherein the shielding member is not disposed on a third side of the casing, and the first side of the casing and the third side of the casing are parallel to each other.

5. The optical element driving mechanism as claimed in claim 1, further comprising a frame, comprising:
   a top surface, having a polygonal structure;
   a first sidewall, extending from an edge of the top surface along the main axis and located on the first side of the casing; and
   a second sidewall, extending from an edge of the top surface along the main axis and located on the second side of the casing,
   wherein the first sidewall and the second sidewall are located on a first imaginary plane and a second imaginary plane respectively, and the first imaginary plane and the second imaginary plane are not parallel to each other.

6. The optical element driving mechanism as claimed in claim 5, wherein the shielding member has a plate-like structure, and the shielding member is parallel to the first sidewall.

7. The optical element driving mechanism as claimed in claim 6, wherein the shielding member is disposed between the driving assembly and the first sidewall, and when viewed in the first direction in which the shielding member is aligned with the first sidewall, the driving assembly, the shielding member, and the first sidewall at least partially overlap.

8. The optical element driving mechanism as claimed in claim 7, wherein the driving assembly comprises a plurality of magnetic elements and a driving board.

9. The optical element driving mechanism as claimed in claim 8, wherein the plurality of magnetic elements comprises the first magnetic element and a second magnetic element.

10. The optical element driving mechanism as claimed in claim 9, wherein the shielding member is disposed on a first magnetic element surface of the first magnetic element, and the first magnetic element surface is parallel to the first sidewall.

11. The optical element driving mechanism as claimed in claim 10, wherein the second magnetic element is disposed on the second side of the casing, and the first magnetic element, the second magnetic element, and the shielding member at least partially overlap when viewed in the first direction.

12. The optical element driving mechanism as claimed in claim 10, wherein the second magnetic element is disposed on the second side of the casing, and the second magnetic element does not overlap the shielding member when viewed in the first direction.

13. The optical element driving mechanism as claimed in claim 9, wherein the plurality of magnetic elements comprise a magnet, and the shielding member protrudes from an upper end of the magnet.

14. The optical element driving mechanism as claimed in claim 9, wherein the plurality of magnetic elements comprise a multipolar magnet having an upper portion and a lower portion, and the polar directions of the upper and lower portions are opposite to each other, wherein the ratio of the height of the upper portion along an optical axis of the lens to the height of the lower portion along the optical axis is ranged between 0.9 to 1.1.

15. The optical element driving mechanism as claimed in claim 9, wherein the plurality of magnetic elements comprise a multipolar magnet having an upper portion and a lower portion, and the polar directions of the upper and lower portions are opposite to each other, wherein the upper portion is positioned corresponding to the second coil to move the lens holder relative to the frame along an optical axis of the lens, and the ratio of the height of the upper portion along the optical axis to the height of the lower portion along the optical axis is greater than 1.1.

16. The optical element driving mechanism as claimed in claim 5, wherein the shielding member is affixed to the frame by insert molding.

17. A multiple-lens camera system, comprising:
an optical module; and
an optical element driving mechanism as claimed in claim 9,
wherein the optical element driving mechanism corresponds to the optical module.

18. The multiple-lens camera system as claimed in claim 17, wherein the first side of the casing is adjacent to the optical module.

* * * * *